INVENTORS:
J. C. ADAIR
W. E. BAIER JR.
R. P. GILMORE
W. O. WOTTLIN

INVENTORS:
J. C. ADAIR
W. E. BAIER JR.
R. P. GILMORE
W. O. WOTTLIN

INVENTORS:
J.C. ADAIR
W.E. BAIER JR.
R.P. GILMORE
W.O. WOTTLIN

3,483,505
PROXIMITY PROFILER
James C. Adair, Bellaire, William E. Baier, Jr., Houston, Ronald P. Gilmore, Bellaire, and William O. Wottlin, Houston, Tex., assignors to Shell Oil Company, New York, N.Y., a corporation of Delaware
Filed Dec. 20, 1968, Ser. No. 785,568
Int. Cl. G01v 1/00
U.S. Cl. 340—15.5    3 Claims

ABSTRACT OF THE DISCLOSURE

A process for profiling a generally vertical geological structure that is acoustically reflective, such as the flank of a salt dome wherein a source of seismic energy and at least one detector are lowered into a borehole located in the vicinity of the geological structure. The detector is located at points in the borehole so that the seismic waves reflected from the vertical structure traveling along substantially horizontal paths arrive at the detector after the waves that travel the shortest distance through the earth and before the tube waves.

BACKGROUND OF THE INVENTION

The present invention relates to a process for surveying subsurface earth formations and more particularly to a process for profiling a generally vertical geological structure, as for example, a fault, a shale wedge, a dike, a salt dome or similar subsurface structure. In the search for petroleum deposits, it is often desirable to know the exact profile of a vertical structure, since petroleum deposits often occur at the intersection or junction interface between the earth formations. Petroleum deposits also occur in various traps formed between two earth formations. Thus, an accurate knowledge of the interface is extremely important. In the past it has been suggested that the profile of a flank of a salt dome could be obtained by lowering a source of seismic waves and detectors into a borehole and recording the traveltime of the seismic waves that travel substantially horizontally from the source to the interface and back to the detectors. While this appears to be a reasonable approach, the method has not been successful, since the seismic waves that travel directly from the source to the detector through the earth or directly via the tube wave have obscured or masked the arrival of the horizontally traveling waves. These and other difficulties resulted from the improper choice of source-to-receiver distance and because inadequate means were used to prevent shot energy from reaching the detector via the cable. The term "tube wave" is used to describe high amplitude source generated waves that travel within the borehole and along its walls at a velocity considerably slower than the compressional velocities of the surrounding earth formations. Thus, prior attempts to map the interface of the salt dome and the surrounding sediments have not been successful.

In addition to the above method, the prior art also suggests that a relatively low velocity layer in the earth could be used to act as a wave guide in transmitting seismic waves to the interface of the salt dome and back to a receiving station. These methods have not been successful since the direct traveling compressional and tube waves obscure the arrival of the horizontally traveling wave. In addition, the noise produced by the generation of seismic waves travels over the cable connecting the source and detector and further obscures the arrival of the horizontal wave.

SUMMARY OF THE INVENTION

The present invention solves the above problems by providing a method and apparatus for determining the distance between the borehole and a generally vertical geological structure. The method comprises the steps of generating and receiving acoustic waves at a series of depths within the borehole to provide a series of points from which the shape of the structure can be determined. At each depth the waves which radiate from and are reflected back to the borehole along generally horizontal paths are received at a location spaced relative to the point of generation by a distance such that the reflected waves are received within a time window. The time window is the interval between the arrival of the first compressional wave that travels to the receiving location through the earth formations along the path generally parallel to the borehole and the time of arrival of borehole or tube waves. The borehole or tube waves are high-amplitude, source-generated waves that travel within the borehole and along its walls at a velocity considerably slower than compressional velocities of the surrounding earth formations. In addition, the frequency spectrum of the tube wave is centered at a lower frequency than that of the reflected waves. While the center of the frequency spectrum of the tube waves is generally lower, the spectrum does overlap that of the reflected waves and normally the tube waves cannot be separated by conventional filtering processes, such as velocity filtering. Further, the tube waves may excite additional disturbances in the vicinity of the receiving location and create noise within the frequency of the desired reflected waves.

The depths at which the waves are generated and received within the borehole are changed with the spacing between the points of generation and reception being changed to the extent required to maintain the time window in spite of the changes in the distance between the borehole and the geological structure. The distance between the borehole and the geological structure is determined by measuring the traveltime of waves that radiate from and are reflected back to the borehole along the generally horizontal path and utilizing the information in conjunction with the acoustical velocities of the earth formations located between the borehole and the geological structure.

In a preferred embodiment, means for generating and receiving the acoustic waves are interconnected by a cable containing a stress member and electrical conductors for transmitting the power to the various units and signals from the units. A weight is attached to the lower end of the apparatus to supply tension to the device as it is lowered into the well. The tension is relieved by temporarily supporting the weight on the wall of the borehole and slacking the cable above the point of the support. The removal of the tension from the cable reduces the noise and other interference that is transmitted over the cable from the source to the receivers.

The actual device can be constructed with the source at the top and one or more detectors positioned below the source. In this case the weight is attached below the lowermost detector and the weight supported adjacent the detector to remove the strain from the cable between the detector and the source. The device can also be constructed by placing the source at the bottom and positioning the detectors above the source in which case the support is placed adjacent the source and the strain relieved from the cable connections between the source and the individual detectors.

BRIEF DESCRIPTION OF THE DRAWINGS

The present invention could be more easily understood from the following detailed description of a preferred embodiment when taken in conjunction with the attached drawings in which.

Figure 1:
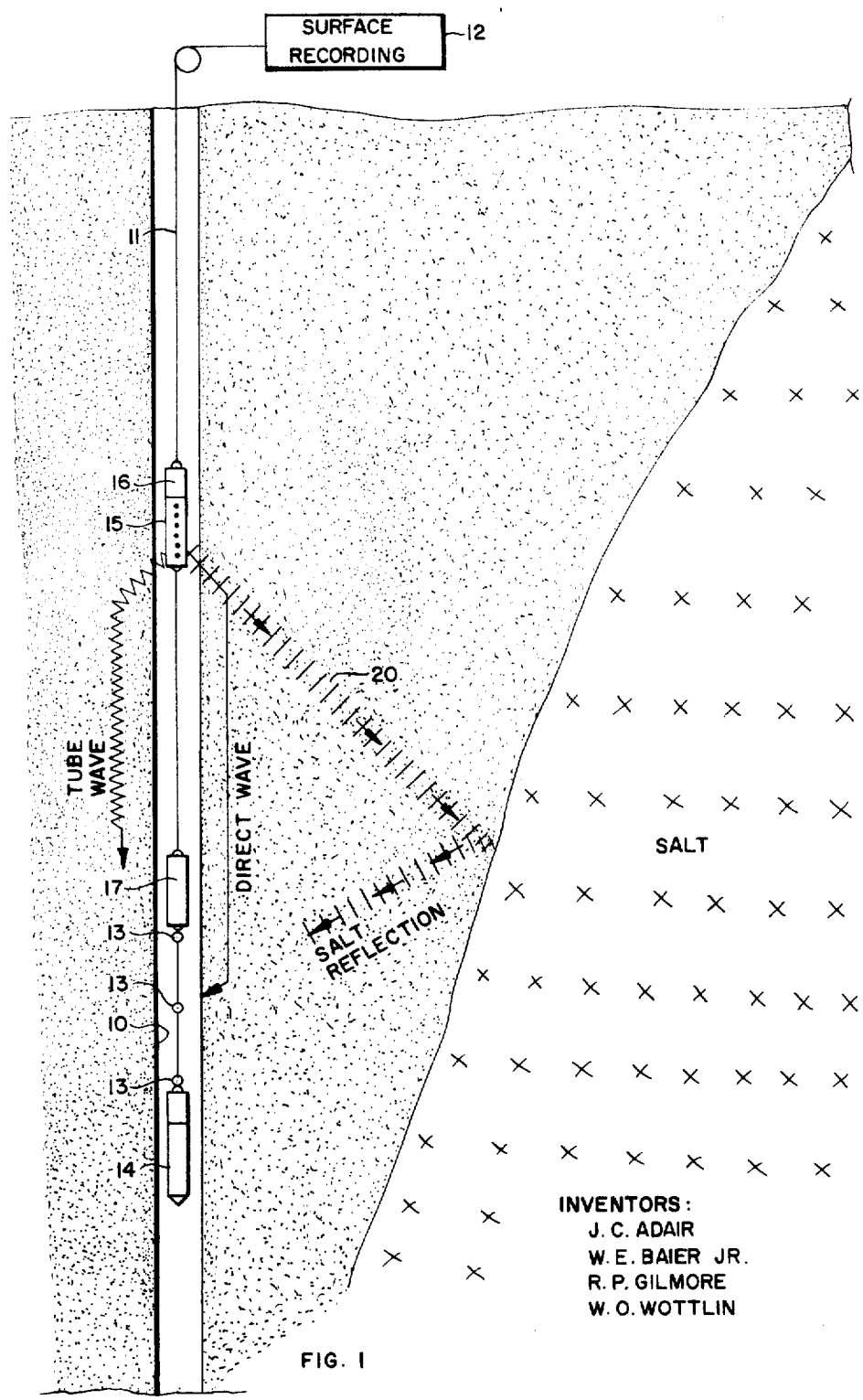
FIGURE 1 is a systematic view of the apparatus constructed according to this invention and positioned in a well to profile the flank of a salt dome.

In order to better understand the present invention it is well to review the various waves that are generated by a seismic source and the disturbances generated by the source. The source generates seismic waves that travel to the detector by various routes. The first arriving wave at the detector is the compressional wave which travels through the formations adjacent to the borehole. This wave normally is of small amplitude and generates a small response in the detector. The later arriving waves which are referred to as borehole or tube waves travel mainly within the borehole or along the borehole wall. The tube waves are relatively large amplitude waves which generate large amplitude signals in the detector that persists for a considerable length of time. In addition to the waves which travel in the borehole and the formations adjacent the borehole, additional disturbances travel through the cable connecting the source to the detector. These disturbances also produce related signals in the detector at approximately the same time that the compressional wave arrives. These disturbances frequently persist a long time.

In addition to the above, the various waves can create additional disturbances adjacent the detector. The additional disturbances produce spurious signals in the receivers that also obscure the desired signal.

The present invention is based on the fact that the tube waves generated by the source and traveling within the borehole fluid have a materially greater amplitude than the reflections from the salt. In fact, the tube waves will have a magnitude that approaches 1000 times the maximum amplitude of the signals that are reflected from the interface of the salt dome and the surrounding formations. In addition, it is known that the tube waves travel at speeds varying from about 1000 to 4500 feet per second while the waves that travel through the formation surrounding the borehole travel at speeds from about 5500 to about 20,000 feet per second.

The present invention uses this information to avoid the above problems by spacing the detectors or receivers from the source of seismic waves so that the desired reflected compressional waves arrive during a time window when the above disturbances are substantially absent. As explained, the term "time window" is used to refer to an interval which occurs after the arrival of the direct waves and prior to the arrival of the tube waves. During this time interval the receiver is in a relatively quiescent state, since the direct arriving wave has decayed to a relatively low level and other disturbances have not reached the receiver. The decay of the signal produced by the direct wave is relatively fast. Of course, the spacing between the source and the receivers must be selected with relation to the velocity of the seismic waves through the formations surrounding the borehole and the expected distance between the borehole and the flank of the salt dome or other geological structure that is being mapped. While this may present a problem in rare circumstances, it is normally not a critical problem since the time window is of relatively long length and thus the spacing may vary over a wide range.

In addition to spacing of the receivers so that the desired waves arrive during the selected time window, the invention also utilizes a means for removing the strain from the cable connecting the source to the detectors or receivers. The removal of the strain from the cable that interconnects the source and the receivers limits the energy that is transmitted directly from the source to the receivers over the cable. The strain is removed from the cable by anchoring the cable at a point located between the source and the receivers and then slacking the cable so that the strain is removed. The anchor may consist of various devices that are available, as for example, side wall anchors and the like.

Referring now to FIGURE 1, there is shown a schematic arrangement of an apparatus suitable for carrying out the method of the present invention. More particularly, there is shown an instrument disposed in a borehole 10 by means of a cable 11. The cable 11 should contain both the electrical conductors required for the electrical circuits of the instrument as well as a stress member having sufficient mechanical strength to support the instruments in the borehole. The cable is connected to a surface recording system 12 that includes both control circuits for actuating the downhole portion of the instrument, as well as instruments for recording the received signals. The downhole instrument consists of three detectors 13 and a source of seismic waves 15. Also included in the downhole instrument are suitable control means 16 for actuating the seismic source when desired. An anchor means 17 is provided for anchoring the sound source at the desired location in the borehole. A weight 14 is provided at the bottom of the downhole instrument to assist in lowering the instrument and insuring that the cable is substantially straight. The detectors may comprise conventional geophones used in seismic surveys or other types of piezoelectric or magnetostrictive type of receivers. Also, the number of detectors may vary from one to a large plurality, although it is preferable to use a plurality. The sound source 15 may comprise various types of mechanical sound sources or an explosive source, for example, a perforating gun. A perforating gun can be used without projectiles to generate seismic waves having sufficient energy to travel a considerable distance in the formations. The control means 16 should include suitable controls for selectively firing the source 15 at desired intervals.

A feature of the invention is the use of the anchor 17 to remove the strain on the cable 11 between the source 15 and the detectors 13. By slacking the cable and removing the strain, the energy transmitted over the cable is reduced. The anchor is set after the instrument is positioned at the desired depth. After the anchor is set, the instrument is lowered to relieve the strain on the cable between the source and detector. When the measurements are completed, the anchor can be retracted and the instrument moved to a new depth. The anchor is then reset and the operation repeated.

As explained above, an important feature of the above invention is the spacing of the detectors or hydrophones to receive the substantially horizontally traveling waves reflected from the salt prior to the arrival of the tube waves. More particularly, the first detector is located approximately 1,000 feet below the sound source 15 while the second detector is located approximately 1,000 feet below the first detector, with the third detector positioned 1,000 feet below the second. This spacing can be used over a wide range of formation velocities and well-to-interface distances. The use of a plurality of detectors will minimize the difficulties in positioning the detectors to insure that at least one is placed in the time window. While only three detectors are shown in FIGURE 1, it is possible to use a larger number in combination with various seismic filtering techniques. For example, twelve detectors in combination with velocity filtering could be used. When a large number of detectors are used, they should be spaced so that they span the anticipated time window. The signals from the detectors can be combined in various orders to provide the best signal.

OPERATION

Figure 2:
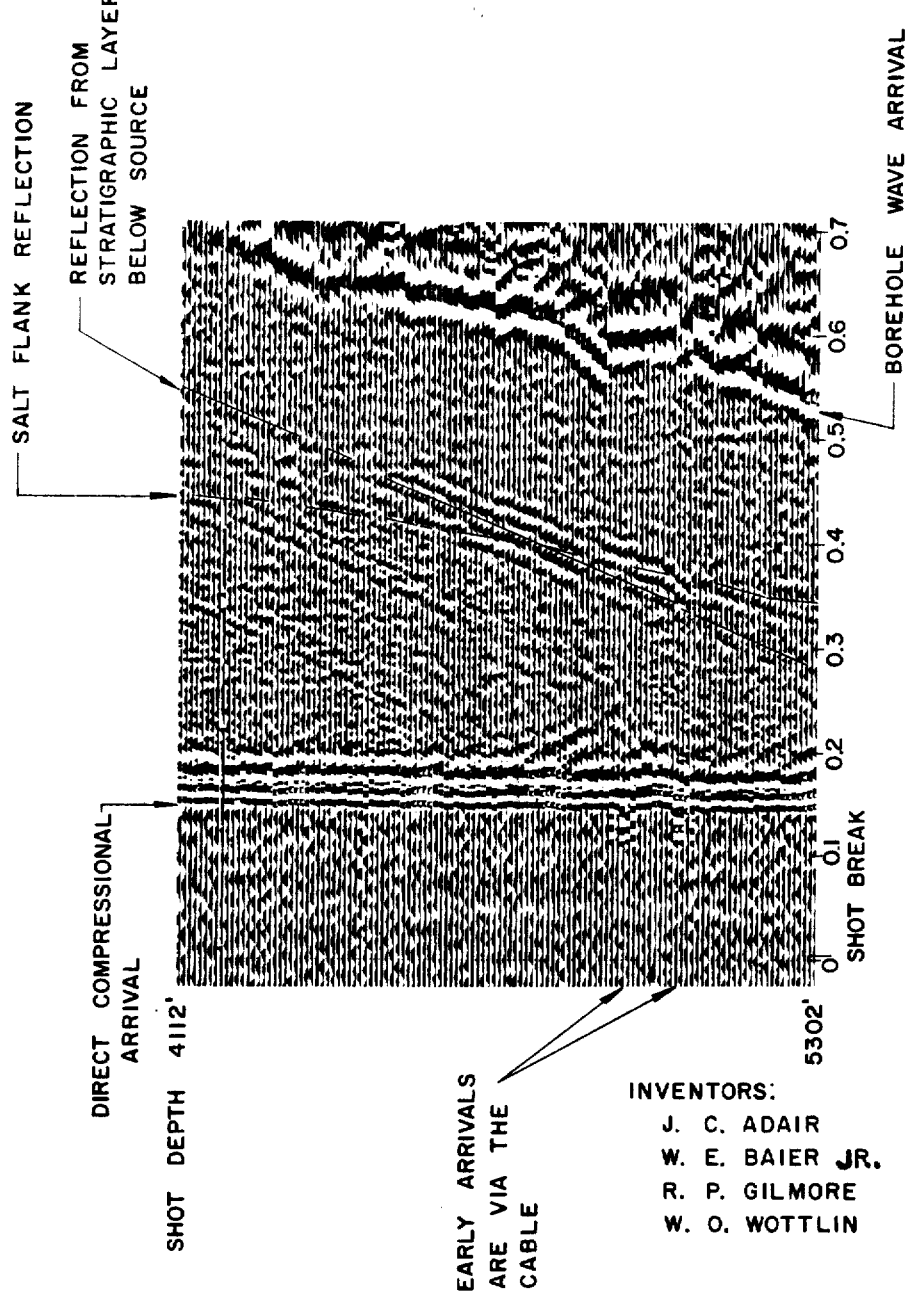
FIGURE 2 is a representative sample of the signals received by the apparatus shown in FIGURE 1.
Figure 3:
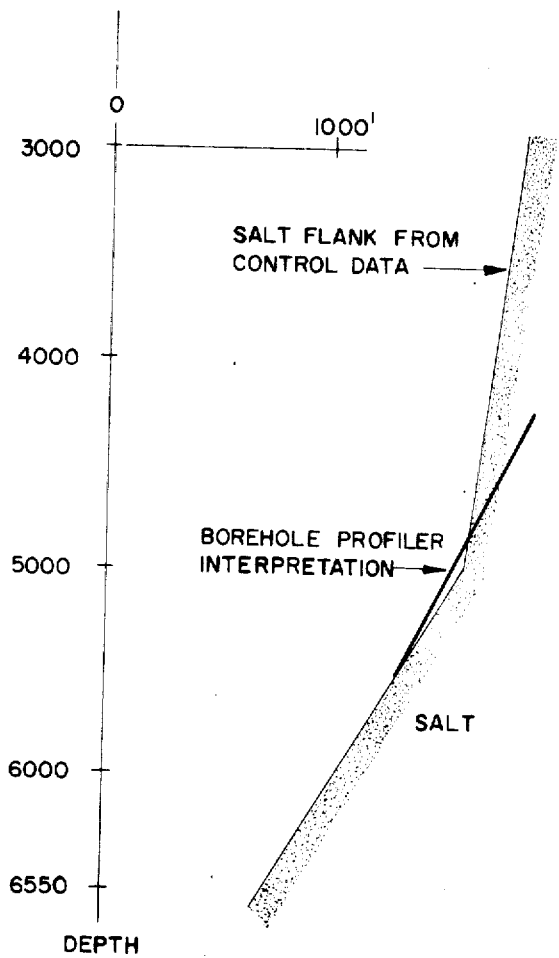
FIGURE 3 is a comparison of the results using the present invention with a known salt dome.

The operation of the invention can be best understood by referring to FIGURES 2 and 3 that illustrate actual records obtained and a comparison of the record with a known profile of the salt flank. As explained above, the method of the present invention is practiced by lowering the instrument into a borehole and making a series of measurements. The exact number of measurements will vary depending on the geometry of the instrument.

After the measurements are made the records can be processed using known seismic record processing procedures. For example, various filtering methods may be used to improve the record quality. The filtering may include combining records to improve signal-to-noise ratios. Of course, various techniques may also be used when recording the measurements, such as automatic volume control and filtering. After the records are processed, they are displayed in a side-by-side relation as shown in FIGURE 2. In FIGURE 2 the shotbreak indicating the firing of the sound source occurred immediately after zero time. The aligned signals indicate the arrival of the direct wave, while the large amplitude signals are the tube or borehole waves. The generally aligned reflected signals indicate the profile of the salt flank and stratigraphic layers below the source.

FIGURE 3 illustrates the correlation between the results obtained with this invention and the known profile of a salt flank. The profile determined by this invention is shown superimposed over the known profile.

From the above description it can be appreciated that the present invention has provided a method by which a generally vertical structure such as the flank of a salt dome may be accurately profiled using a source of seismic waves, an anchor, and one or more detectors. A plurality of detectors assures that the waves reflected arrive at one, some, or all in an appropriate time window between the direct formation arrival and the tube wave arrival so that the reflected waves can be resolved therefrom.

Also, if the salt is sufficiently close to the well, first arrival refractions from the salt may be observed. These, as well as reflections, may be used to determine the salt distance. For the probable salt range, these waves probably would be observed only at the more distant detector.

While the invention has been described in relation to an instrument having a sound source at the top with detectors spaced below, the opposite arrngaement could also be used. When the sound source is located below the detectors, the anchor must also be located below the detectors, preferably adjacent the sound source. Using this arrangement, the stress will be removed from the portion of the cable between the sound source and the detectors when the cable is slacked.

We claim as our invention:

1. A process for profiling a generally vertical interface comprising:
   generating and receiving seismic waves within a borehole;
   spacing at least two detectors from each other and the source so that the seismic waves that travel away from the borehole, reflect from the interface and return to the borehole along substantially horizontal paths arrive at at least one of the detectors after waves that travel the shortest distance through the earth formations, but ahead of tube waves that travel along the borehole;
   receiving the substantially horizontally traveling waves at the detectors while attenuating waves that travel along acoustically conductive strands that extend between the points of generation and reception; and
   measuring the traveltime of the substantially horizontally traveling waves to indicate the proximity of the interface.

2. The process of claim 1 wherein said waves are received at more than two points and both the point of generation and the points of reception are moved equal distances through the well between generation of the seismic waves and are stationary when the seismic waves are generated.

3. A process for determining the distance between a borehole and the nearest approach of a generally vertical acoustically reflective geological structure, which process comprises:
   generating acoustic waves within the borehole at a plurality of depths;
   receiving the acoustic waves within the borehole at least at one location spaced from each of at least one location at which acoustic waves are generated by a distance such that the waves which are reflected from the geological structure are received significantly later than the associated direct waves which travel through the earth formations along paths generally parallel to the borehole and are received significantly earlier than the associated tube waves that travel within or along the borehole; and
   recording the relationship between times at which the acoustic waves are generated and the times at which their reflections are received at each of a plurality of depths within the borehole.

References Cited

UNITED STATES PATENTS

| | | | |
|---|---|---|---|
| 2,813,590 | 11/1957 | McDonald | 390—15.5 |
| 2,865,463 | 12/1958 | Itria | 390—15.5 |

RODNEY D. BENNETT, JR., Primary Examiner

CHARLES E. WANDS, Assistant Examiner